J. R. Taylor.
Boat Detaching.
N° 60,965. Patented Jan. 1, 1867.

Witnesses
Jno. D. Patten
T. J. Chamberlain

Inventor.
James R. Taylor
By atty A. B. Stoughton

United States Patent Office.

JAMES R. TAYLOR, OF NEW YORK, N. Y.

Letters Patent No. 60,965, dated January 1, 1867.

---

IMPROVED BOAT-DETACHING TACKLE.

---

The Schedule referred to in these Letters Patent and making part of the same.

---

TO ALL WHOM IT MAY CONCERN:

Be it known that I, JAMES R. TAYLOR, of the city, county, and State of New York, have invented certain new and useful improvements in Apparatus for Detaching Boats; and I do hereby declare the following to be a full, clear, and exact description of the same, reference being had to the accompanying drawings, making a part of this specification, in which—

Similar letters of reference where they occur in the separate figures denote like parts in both of the drawings.

This invention relates to the particular manner of constructing and arranging the two parts that constitute the attaching and detaching apparatus, so that they may be conveniently used for either purpose.

To enable others skilled in the art to make and use my invention, I will proceed to describe the same with reference to the drawings.

Figure 1:
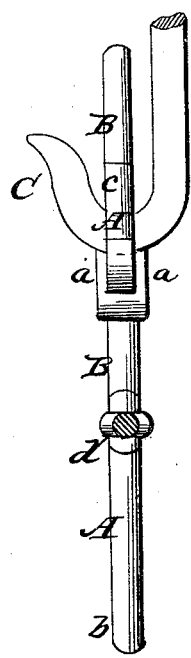
Figure 1 represents a front view of the detaching apparatus.
Figure 2:
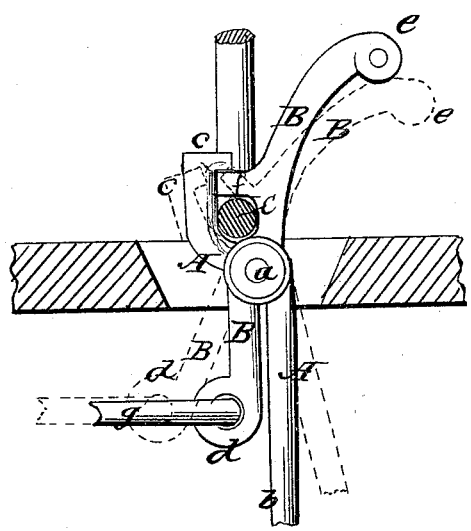
Figure 2 represents a side view of the same.

The part of the apparatus which I denominate the holding-head is composed of two pieces, A B, which are pivoted together at $a$. The piece A is fastened to the boat by its long stem, $b$, and bending out of the line of the stem at the pivoted point its upper portion is formed into a hook or shoulder, $c$. The piece B that is pivoted to the piece A has an under projecting portion, $d$, with a dead-eye in it, to which the line or rod which operates its mate or fellow at the opposite end of the boat, and an upward projecting portion, $e$, which serves as a hand-lever for tripping or detaching the hook $c$ of the block or line by which the boat is suspended or held. The piece B has also a projecting arm, $f$, which takes under the arm or shoulder $c$ of the other piece, A, so that the two shoulders, arms, or projections shall overlap or interlock with each other. The hook C is passed under the under arm $f$, as shown in the drawings, and in that position, the weight being vertical, the arms mutually sustain each other, and hold the hook and boat. When the portion $e$ is drawn back, as shown by red lines in fig. 2, it separates the arm $f$ from the arm $c$, and allows the hook to clear and pass out, the under portions of the arms being slightly rounded or inclined, so as not to hold the hook when it clears. A rod or line, $g$, is connected at $d$, which extends to the apparatus at the other end of the boat, for disconnecting at that end—the one so detached not requiring the part $e$ on it.

Having thus fully described my invention, what I claim therein as new, and desire to secure by Letters Patent, is—

The combination of the two hinged pieces A B, with their projecting portions $c, d, e, f$, constructed, arranged, and operating together as and for the purpose set forth and described.

JAMES R. TAYLOR.

Witnesses:
A. B. STOUGHTON,
EDM. F. BROWN.